L. MESSER.

Assignor to ZINN & MESSER.

Clasp for Pocket-Books.

No. 8,106. Reissued Feb. 26, 1878.

Witnesses.
Chas. Krahlers.
E. F. Kastenhuber

Inventor.
Louis Messer
pr Van Santvoord & Hauff
attys

N. PETERS, PHOTO-LITHOGRAPHER, WASHINGTON, D. C.

UNITED STATES PATENT OFFICE.

LOUIS MESSER, OF NEW YORK, N. Y., ASSIGNOR TO ZINN & MESSER, OF SAME PLACE.

IMPROVEMENT IN CLASPS FOR POCKET-BOOKS.

Specification forming part of Letters Patent No. 165,110, dated June 29, 1875; Reissue No. 8,106, dated February 26, 1878; application filed February 16, 1878.

*To all whom it may concern:*

Be it known that I, LOUIS MESSER, of the city, county, and State of New York, did invent a new and useful Improvement in Clasps for Pocket-Books, which improvement is fully set forth in the following specification, reference being had to the accompanying drawing, in which—

Figure 1:
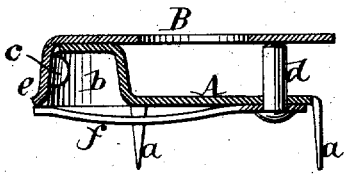
Figure 2:
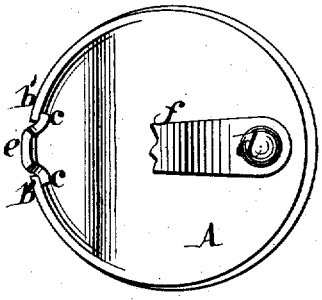
Figure 3:
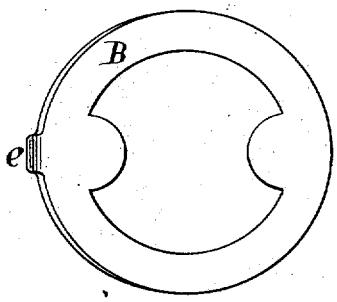
Figure 4:
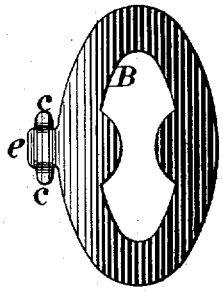
Figure 5:
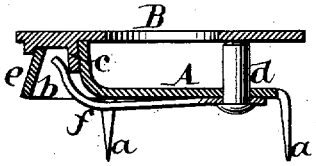
Figure 6:
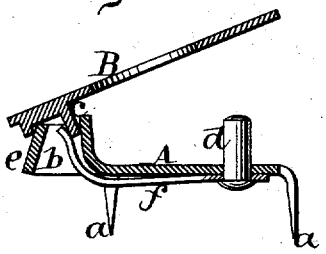

Figure 1 represents a vertical central section. Fig. 2 is an inverted plan. Fig. 3 is a plan or top view. Fig. 4 is a perspective view of the spring-cap detached. Fig. 5 is a section of a modification thereof when the clasp is closed. Fig. 6 is a similar section when the clasp is open.

Similar letters indicate corresponding parts.

Clasps for pocket-books have heretofore been made of a cap, a tail-piece projecting from said cap, a base-plate, a spring secured to said base-plate and acting on the tail-piece, and a hinge-joint formed by a pin which passes through lugs attached to the base-plate and to the cap.

This device is expensive to make; and the object of my invention is to reduce the cost of manufacturing spring-clasps of a similar nature.

My invention consists in the combination, in a spring-clasp, of a shell, which forms the base or supporting plate, a cap provided with a tail-piece, which is adapted to engage with said shell, and allows the cap to swing up and down, a spring secured to the shell and bearing on the tail-piece of the cap, and a stud secured to the base-plate, the whole being constructed so that, by the action of said spring, the cap is retained in position in the shell, and no extra labor is required to produce the hinge-joint.

In the drawing, the letter A designates the shell forming the base or supporting plate of my clasp, which is stamped out of sheet metal, and provided with a chamber, *b*, and with spurs *a*, which serve to fasten the same to the body of a pocket-book or other similar article.

The bottom flanges *b′ b′* of the shell are partially cut away, to leave an opening for the admission of the tail-piece *e*, which projects from the cap B. This cap is stamped out of sheet metal, and its tail-piece is adapted to engage with the shell. To the under surface of this shell is secured a spring, *f*, and in the example shown in Figs. 1 to 4 of the drawing this spring bears on the tail-piece, and the means used for enabling said tail-piece to engage with the shell are arms *c*, which extend from the tail-piece and bear against the inner surfaces of the side flanges *b* of the shell.

To the upper surface of the shell is secured a stud, *d*, which passes through an opening in the flap of the pocket-book, and upon which stud the cap bears when pressed down in its position for locking.

The tail-piece of the cap is so formed that when said cap is turned down it is firmly depressed upon the stud *d* by the action of the spring *f*; but if the cap is raised sufficiently far it is retained in its open position by the spring.

In the example shown in Figs. 5 and 6, the spring *f*, instead of bearing on the tail-piece *e* itself, bears on the arms *c*, and a sliding motion may be given to the cap B, so that when the same is moved back it will be thrown open by the action of the spring, and when it is moved forward it will be closed down.

It will be seen from this description that in the construction of my spring-clasp only four pieces are used, viz., the spring, the cap, the stud, and the shell, said cap and shell being so arranged that when they are properly placed together the required hinge-joint is produced without requiring any further labor, and, by the action of the spring, said cap and shell, after having been put together, are retained in the required position, allowing the cap to open and to close, as above described.

What I claim as new, and desire to secure by Letters Patent, is—

The combination, in a spring-clasp, of a shell, which forms the base or supporting plate, a cap provided with a tail-piece adapted to engage with said shell and allow the cap to swing up and down, a spring secured to the shell and bearing upon the tail-piece of the cap, and a stud fixed upon the base-plate, and arranged to operate substantially in the manner and for the purpose herein described.

In testimony that I claim the foregoing I have hereunto set my hand and seal this 15th day of February, 1878.

LOUIS MESSER. [L. S.]

Witnesses:

W. HAUFF,

W. C. HAUFF.